March 17, 1925.      1,529,661
E. MILLER
GLASS PRESSING AND BLOWING MACHINE
Filed May 25, 1922      6 Sheets-Sheet 2
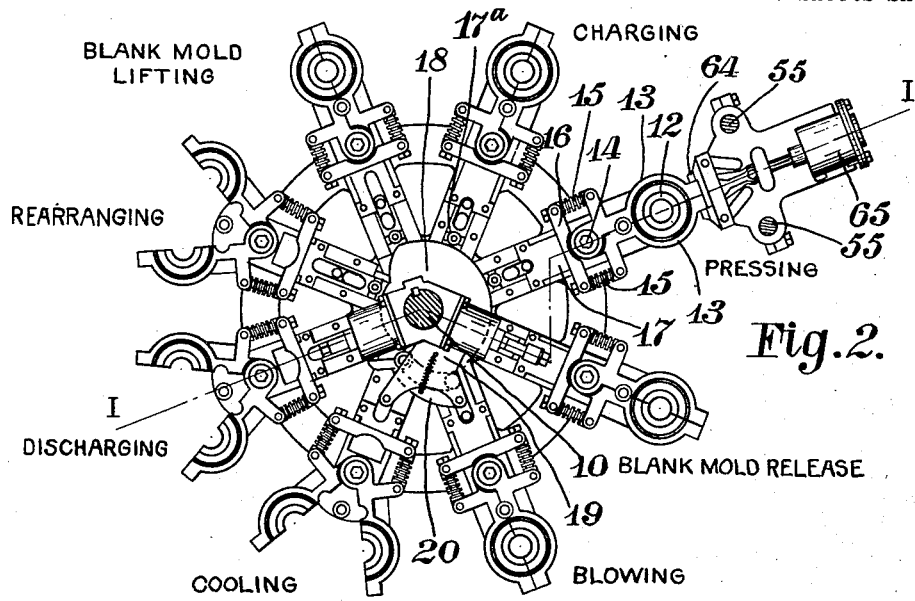
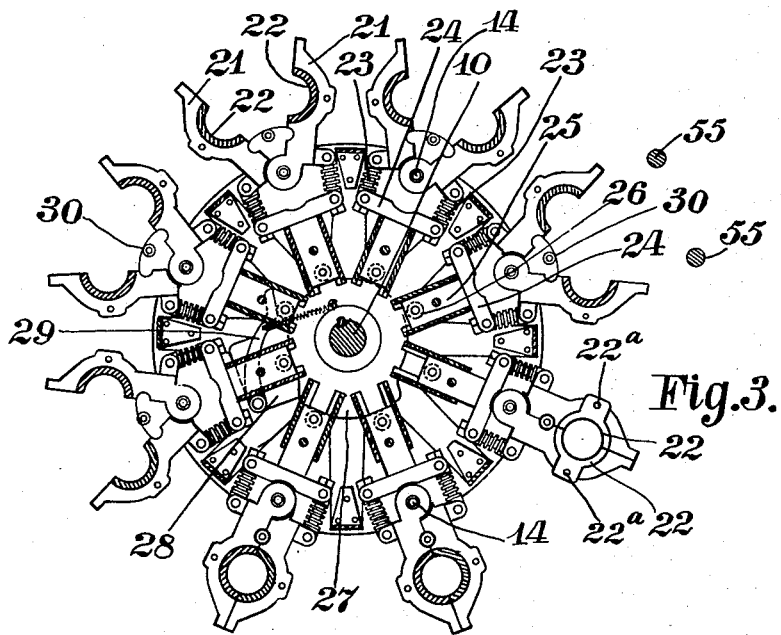
INVENTOR
Edward Miller
ATTYS March 17, 1925.  E. MILLER  1,529,661

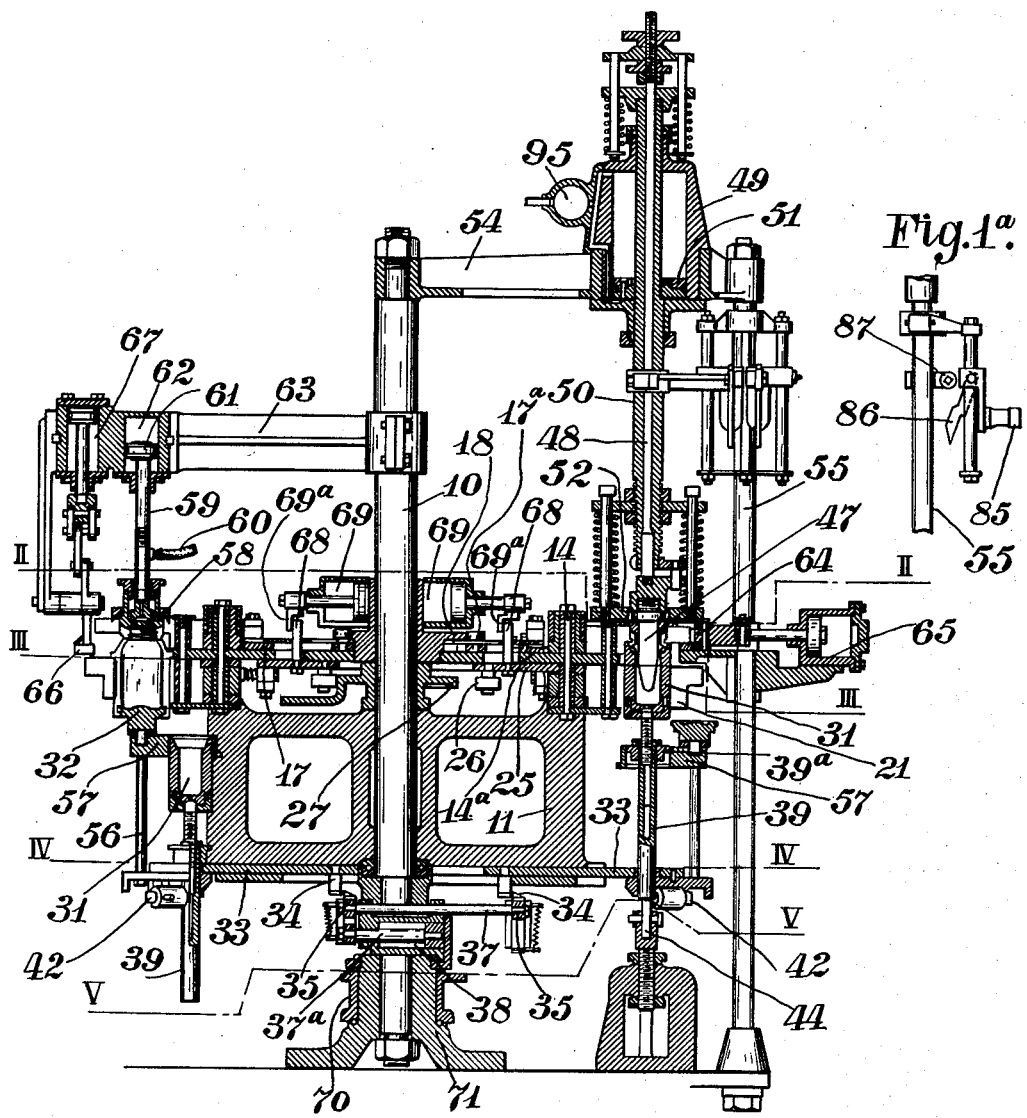

GLASS PRESSING AND BLOWING MACHINE

Filed May 25, 1922    6 Sheets-Sheet 3

INVENTOR
Edward Miller
ATTYS.

March 17, 1925.
E. MILLER
GLASS PRESSING AND BLOWING MACHINE
Filed May 25, 1922   6 Sheets-Sheet 4
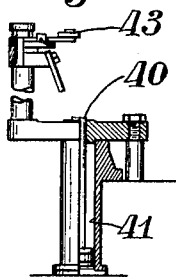
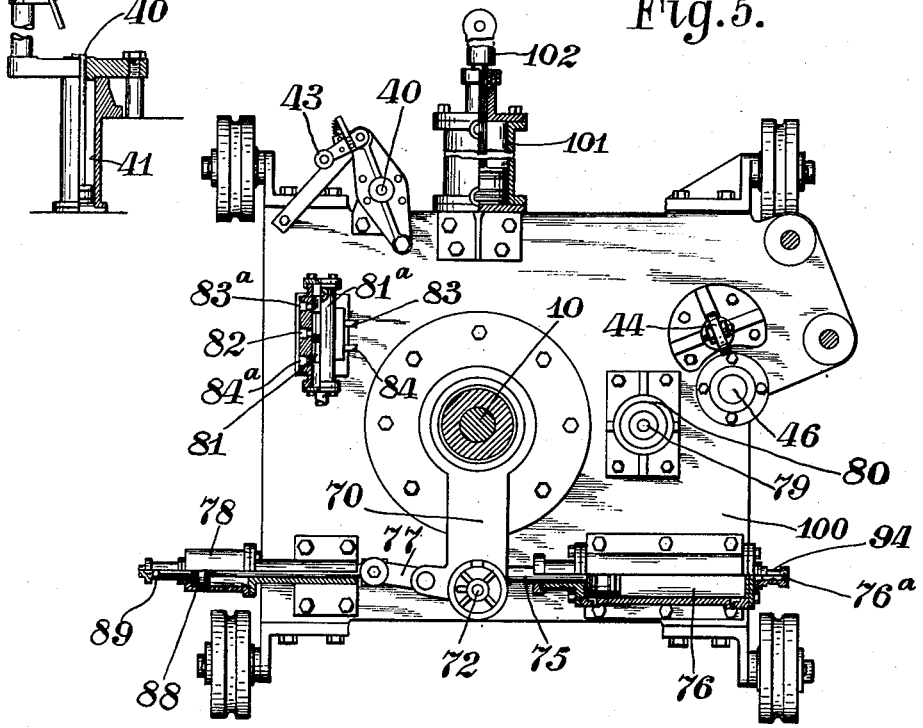
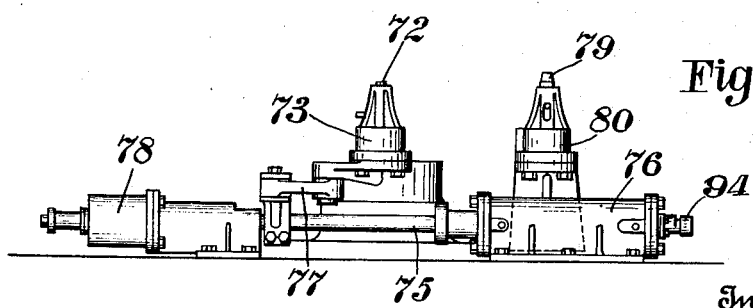
Inventor
Edward Miller March 17, 1925.  1,529,661
E. MILLER
GLASS PRESSING AND BLOWING MACHINE
Filed May 25, 1922  6 Sheets-Sheet 5
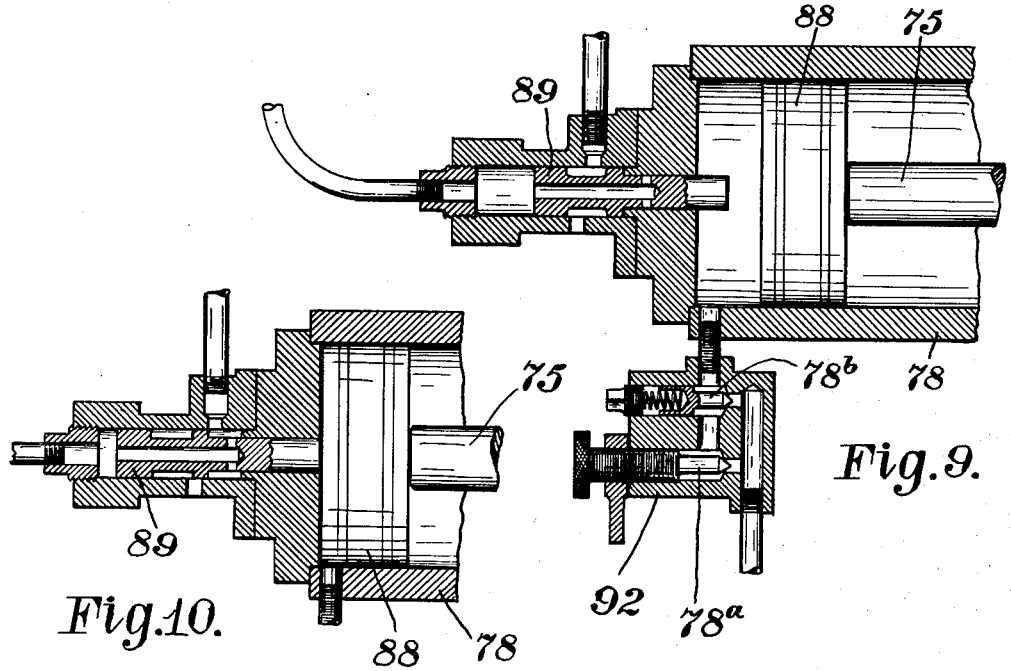
Fig.9.
Fig.10.
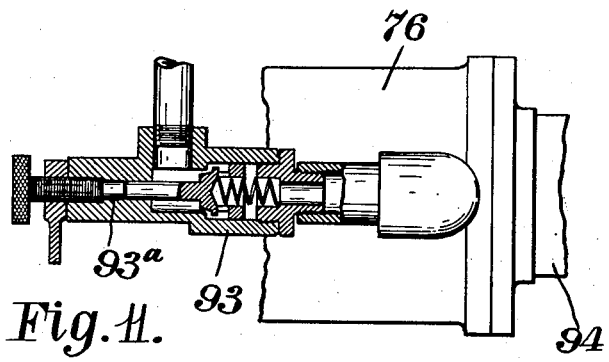
Fig.11.
INVENTOR
EDWARD MILLER
ATTYS.

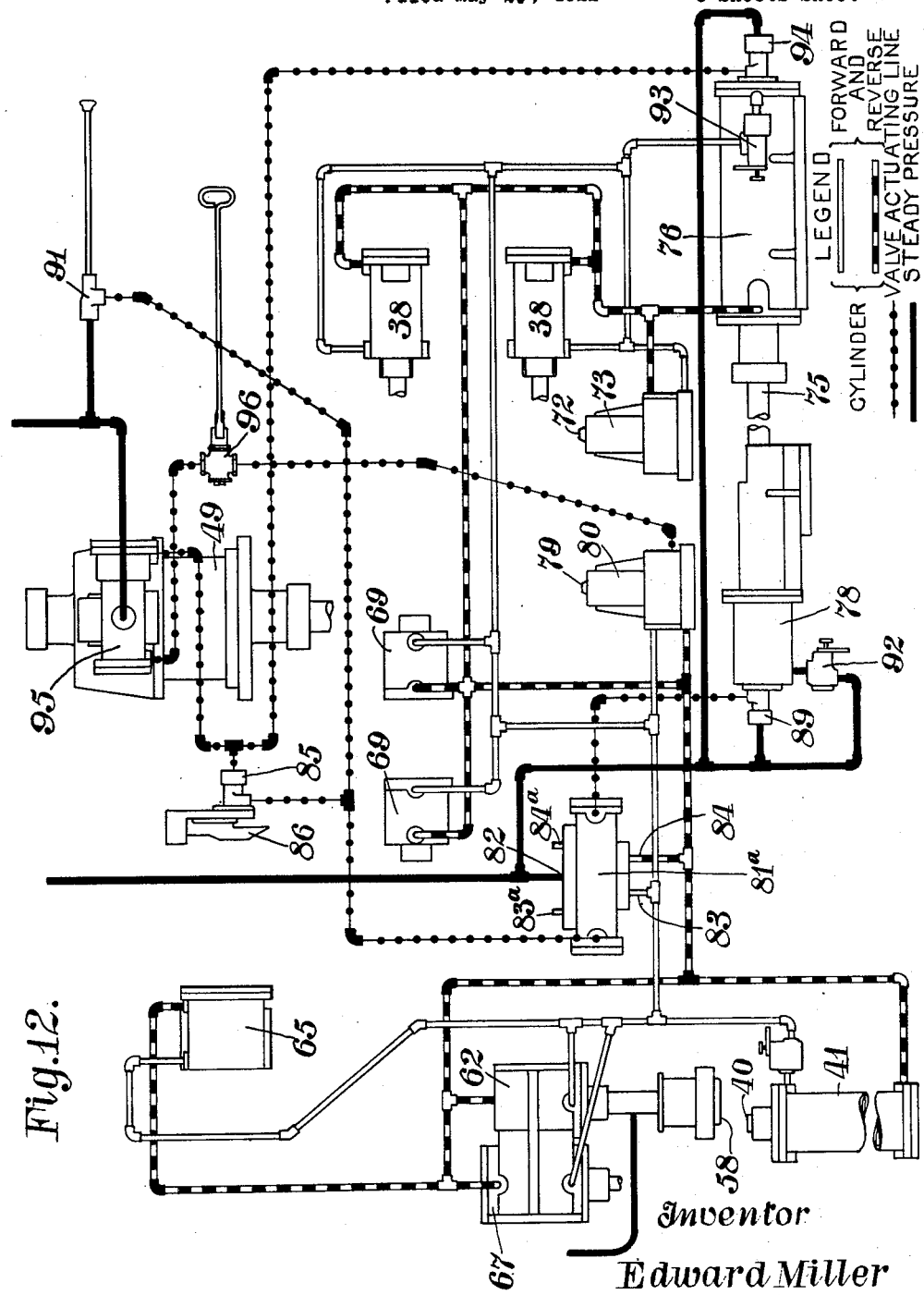

Patented Mar. 17, 1925.

1,529,661

UNITED STATES PATENT OFFICE.

EDWARD MILLER, OF COLUMBUS, OHIO.

GLASS PRESSING AND BLOWING MACHINE.

Application filed May 25, 1922. Serial No. 563,699.

*To all whom it may concern:*

Be it known that I, EDWARD MILLER, a citizen of the United States, residing at Columbus, in the county of Franklin and State of Ohio, have invented a certain new and useful Improvement in Glass Pressing and Blowing Machines, of which the following is a specification.

Heretofore in forming glass vessels, jars for example, in a pressing and blowing machine the necks are molded with a ring integral with the blow mold body. An illustration of such a machine with such blow mold is found in the patent of the United States issued to me April 11, 1905, No. 787,050.

Before blowing the glass to its final form in the blow mold of such a machine there is first prepared from the unformed lump of molten glass what is called the parison or blank. The parison is fashioned by using a special smaller mold, distinct from the blow mold, inserted or telescoped upward into the blow mold against the shoulder-forming portion thereof below the neck ring, and then pressing the molten glass into its parison form with a plunger. In this operation the neck ring of the blow mold cooperates with the parison or blank mold to form the exterior of the parison. Because the upper end of the parison mold must fit closely against the shoulder forming portion of the blow mold it does not appear to have been practicable with a pressing and blowing machine prior to my present invention to produce a blown molded vessel having a bottom of smaller diameter than that of its shoulder hence the shapes of such vessels were correspondingly limited in their design.

To overcome the objection recited I propose to provide in such a machine a mold having a neck ring distinct from the body of the blow mold and a cooperating movable bottom for the latter as hereinafter described so that the body portion of the glass vessel may be of any desired style so far as the relative dimensions of its shoulder and bottom are concerned.

My invention also includes special mechanism for the operation of a glass blowing machine using a parison and blow mold in which the neck ring is distinct from and operated independently of the blow mold in forming the parison.

In connection with my invention I provide special means whereby the cycle of operation in such a machine having been initiated may be automatically repeated indefinitely without further manipulation of the starting valve. My invention also includes other details and combinations of parts herein set forth.

In carrying out my invention it is desirable to employ eight of the blow mold bodies with their cooperating neck ring molds, said neck and body molds being spaced forty five degrees apart around a common axis, so that with the provision of mechanism as hereinafter described the operations of charging, pressing, blowing, discharging, rearranging blank mold and blank mold placing can proceed simultaneously and automatically.

In the accompanying drawings in which I have illustrated but one embodiment of the invention—

Fig. 1 is mainly a vertical sectional view taken on the line I—I Fig. 2 with parts and the piping omitted for the sake of clearness.

Fig. 1ª is a detail of means for kicking the main valve actuated by the plunger stroke to shift the operating pressure.

Fig. 2 is a horizontal sectional view taken on the line II—II Fig. 1 looking down.

Fig. 3 is mainly a horizontal sectional view taken on the line III—III Fig. 1 looking down.

Fig. 4 is a horizontal sectional view on the line IV—IV Fig. 1.

Fig. 4ª is a sectional detail of parison mold cushion.

Fig. 5 is a horizontal sectional view on the line V—V Fig. 1.

Fig. 5ª is a combined section and elevation of the parison lifter piston.

Fig. 6 is a front elevation of the table moving means.

Figure 7:
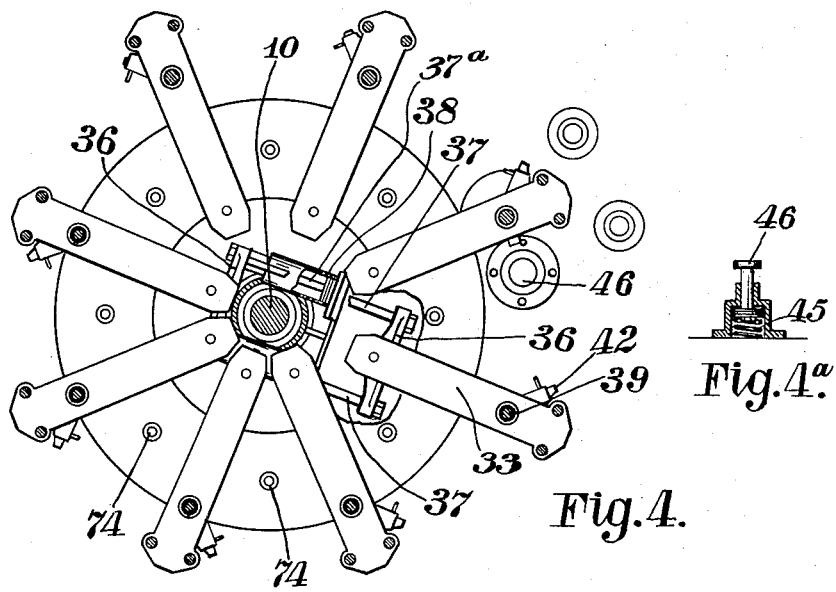

Fig. 7 is mainly a vertical sectional view on a larger scale showing the blow mold carrier, the neck ring and its carrier and parison mold assembled with the parison mold and plunger therein.

Figure 8:
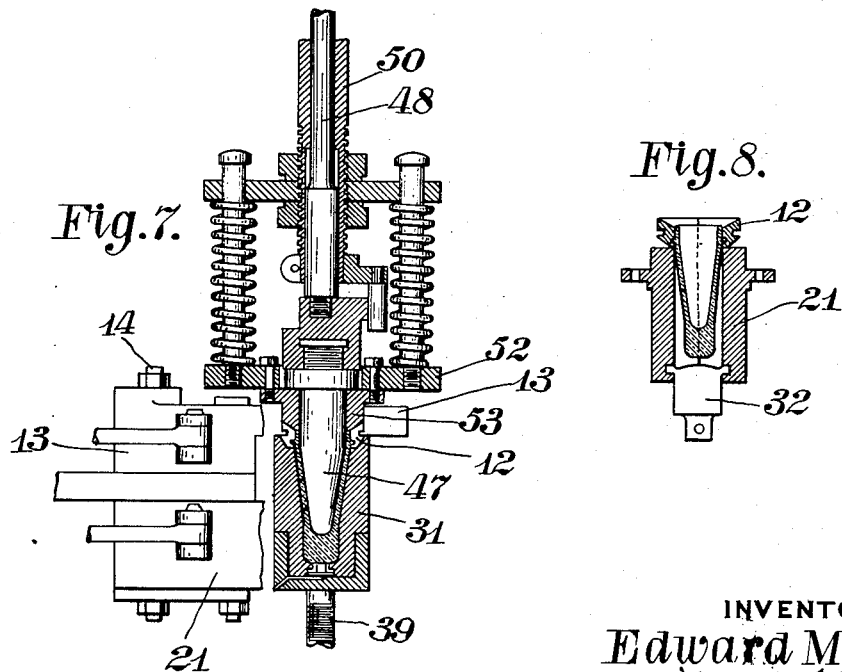

Fig. 8 is a sectional view showing the parison in the blow mold preparatory to the blowing operation.

Fig. 9 is a detail on a larger scale in section of the cushion cylinder of the table moving elements showing the by-pass and the reversing valve before the latter has been shifted.

Fig. 10 is a similar detail view showing the valve shifted.

Fig. 11 is a sectional detail of the plunger regulating valve.

Fig. 12 shows in diagrammatic view my scheme of piping for operating various parts of the machine by fluid pressure.

In the several views 10 designates a stationary center column or spindle which is supported upon a suitable truck 100 (see Fig. 5) and around which spindle the molds revolve. This column has fixed to it a table 11 that carries the principal mechanism for operating the molds.

The neck ring mold is composed of two halves 12 secured to and carried in two semi-circular parts 13 suitably hinged around the upper part of a suitably bushed pin 14 carried by a plate 14ª so that the parts of the ring and the molds can be closed together (see Fig. 2). The neck ring is often formed with cavities to produce threads, lips or other protrusions or depressions on the neck of the jar. The means for operating the parts of the neck ring carrier includes two pins 15 provided with coil springs, said pins pivoted to lateral arms on the carrier parts and said pins being connected by a cross bar 16 carried and operated by a radial slide 17. The radial slide 17 is made with a slot and carries an upwardly projecting rollered pin 17ª acted on by a cam 18 fixed on the center column 10, said cam adapted to press the cross bar outward to close, at the proper time, the neck ring carriers and the parts of the neck ring. Pivoted to a suitable member 19 extending horizontally from the center column 10 is a spring held neck-ring opening cam 20.

The main or blow mold carriers are somewhat similar in construction to the neck mold carriers, that is they are each composed of semi-circular parts 21 to which the halves of the blow mold 22 are secured by pins or screws at 22ª. The parts 21 of the blow mold carrier are hinged around the lower portion of the pin 14 and the means for operating the carrier parts include two pins 23 provided with springs, said pins being pivoted to lateral arms on said carrier parts, and connected by a cross bar 24 carried on and operated by a radial slide 25. Said slide 25 carries a rollered pin 26 adapted to be actuated outward by a cam 27 fixed on the center column 10 to close, at the proper time, the blow mold carrier sections and the contained parts of the mold. Arranged on a fixed plate 28 extending from the center column 10 is a spring-held cam lever 29 adapted to act on said rollered pin to retract said slide and open the mold carriers at the proper time. A centering or stop pin 30 is provided to insure the closing in proper position of both the neck ring and blow mold carriers.

The parison mold 31 and blow mold bottom 32 are carried by a slide 33 suitably supported at the lower side of the table 11, said slide having downwardly projecting pins 34 adapted to be actuated by pawls 35 on a cross head 36 on parallel rods 37 (see Fig. 4) connected with parallel piston rods 37ª (see Fig. 1) in cylinders 38 so as to shift horizontally, at the proper time, the parison mold and the blow mold bottom into proper position to perform their respective functions. The parison mold 31 is a closed one—that is it is not formed in halves and its body portion is preferably detachably and adjustably supported on the upper end of a stem 39 that is adapted to be raised and lowered through a suitable opening in the slide 33. The parison mold is lifted to its functioning position, as shown at the right in Fig. 1, by means of a piston rod 40 in a stationary cylinder 41 on the platform (see Fig. 5ª), acting upward on the stem 39, it being supported in its elevated position by means of latch 42. The latch 42 is actuated to be moved into such supporting position by means of a spring actuated roller 43 the stem of the parison being larger in diameter than the lifting end of the piston stem 40 so as to provide room for the latch to reach under the parison stem. When the plunger is pressing the parison, said stem 39 is supported by an adjustable stationary roller 44 on the platform. After functioning the parison mold is released by the action of the roller 44 on the latch 42 transferring the weight to the roller after passing which the mold falls by gravity to a position like that shown at the left hand side of Fig. 1. Violence in the fall of the parison mold is relieved by a cushioning cylinder 45 having a piston and an upwardly projecting stem 46 upon the head of which the stem of the piston strikes in the fall.

The plunger 47 for pressing the parison is carried on a stem 48 extending upward through a fluid pressure cylinder 49. Beyond the cylinder 49 the stem 48 is yieldingly connected with a tubular rod 50, the latter provided with a piston 51 in the cylinder 49 adapted to be actuated by pressure to raise and lower the plunger and apply proper pressure thereto to shape the parison. The lower end of the tubular piston rod 50 is equipped with a yielding frame member 52 (see Fig. 7 through which the plunger works, said frame member 52 carrying a stripper ring 53 (see Fig. 7) to strip the glass from the plunger when the latter is raised. The cylinder 49 is carried by a horizontal bracket 54 secured to the upper end of the center column 10 and a supplementing parallel column 55 resting on the truck 100.

The blow mold bottom 32 is removably supported upon a rod 56 also removably fixed to the slide 33. Before the blow mold arrives at that position where its sections are to be closed around the parison the blow mold bottom is shifted radially inward by the operation of the slide 33 into position between the blow mold sections so that when said sections are closed around the parison they are at the same time closed around the mold bottom as indicated in Figs. 1 and 8. The rod carrying the blow mold bottom also carries a guiding member 57 pierced for the passage of the parison mold. The stem 39 of the parison mold is provided with a collar 39ª fitting in the perforation of the guiding member 57 and guiding the parison mold stem to its operating position as seen at the right hand side of Fig. 1.

The blowing means includes a suitable head 58 carried on the lower end of a pipe 59 to which the blowing air is supplied by a hose 60, said pipe 59 having at its upper end a piston 61 worked by fluid pressure in a cylinder 62 for raising and lowering the blow head. The cylinder 62 is supported upon a suitable bracket arm 63 extending from the center column 10.

When the parison or blank is being pressed by the plunger it is important that the outer ends of the neck ring carriers be firmly held together hence suitable clamping jaws 64 actuated by a fluid pressure cylinder 65 and piston therein are provided. Likewise when the parison is being blown in the main or blow mold the sections of the latter should be firmly held together hence suitable clamping jaws 66 actuated by a piston in fluid pressure cylinder 67 carried on the bracket arm 63.

The blow mold slides 25 are each provided with an upwardly projecting pin 68 and secured to the center column 10 are two fluid pressure cylinders 69, 69, having piston rods with cross heads 69ª in front of which the pins 68 travel. These cross heads are so positioned that one closes the mold sections while the other opens them at the proper time as hereinafter set forth.

The means for intermittently moving the table and molds around the center spindle includes a horizontally arranged oscillating arm 70 journaled on the shoe 71 of the center column (see Fig. 1), said arm carrying at its free end a pin 72 and a fluid pressure cylinder 73 for actuating said pin up and down. Said pin 72 is arranged to successively engage each one of a circular series of sockets or holes 74 (see Fig. 4) in the lower side of the table, said sockets being spaced forty-five degrees apart. The arm 70 is oscillated back and forth through an arc of forty-five degrees by means of a piston rod 75 having at one end a suitable piston in a fluid pressure cylinder 76, said arm being connected with the piston rod by means of a link 77 to provide for the difference between the rectilinear and curvilinear motions of said rod and arm respectively. The other end of the piston rod 75 works in a suitable cushioning cylinder 78 to retard the final motion of the table into its locked position. The exhausting pressure in the cylinder 78 is regulated by an adjustable needle valve 78ª in a bypass chamber 92. The chamber 92 also contains a spring held needle valve 78ᵇ permitting access of pressure to cause the retrograde movement of the piston 88 and rod 75. When the table has been moved through one unit of its travel it is locked by another but horizontally stationary pin 79 located a quadrant behind, said last named pin being actuated by a fluid pressure cylinder 80. The locking pin 79 holds the table from accidental movement while the table moving pin 72 is withdrawn and the arm 70 retracted to take a fresh hold. Simultaneously with the application of pressure to move the table, pressure is applied to withdraw the locking pin 79 so that the table is at no time during the operation free from both pins.

The molds are moved clock-wise as viewed in the drawings. The operation taking place in the several positions of the molding appliances are briefly indicated on Fig. 2 of the drawings. When the neck ring holders are in the position shown in Fig. 2 the blow mold holders are in the positions shown in Fig. 3. As identical operations take place in the cycle of each unit of the mechanism a description with reference to one unit in its cycle will suffice for all. At the place marked "Charging" the neck ring is closed, the blow mold section open, and the parison mold up in position to receive a charge of hot glass. At the next or "pressing" position the plunger is depressed to form the parison and the plunger removed immediately following this operation; and while the mold is moved to its next or third position marked "Parison mold release" the parison mold drops out from between the still open sections of the blow mold, the parison being retained and carried by the neck mold. At this third position the blow mold sections have closed around the parison and bottom. At the next or fourth position, towit, "blowing" position the parison is blown to the formed article. At the fifth or "cooling" position the neck ring is opened. At the sixth or "discharging" position the blow mold sections are opened leaving the jar or other molded article supported on the blow mold bottom from which it is removed by the operator. At the seventh position, towit, the "rearranging" position—the parison mold and bottom are shifted horizontally to bring the parison mold into vertical line with the axis of the mold or neck ring section. At the eighth or "parison mold lifted" position the parison mold is lifted into position between the open blow mold sections and the neck ring closed after which they are moved to the charging position and the cycle of operations repeated.

Any suitable means can be employed for operating by fluid pressure—air for example— the several elements of the machine designed to be so operated and in the order and manner described herein. But in the diagrammatic view Fig. 12 is illustrated a special arrangement devised by me whereby the cycle of operations being once initiated may be automatically repeated indefinitely without manipulation of the starting or trip valve 91. For this purpose there is employed a main automatic valve 81 in a suitable cylinder 81$^a$. Said cylinder 81$^a$ has a central port 82 for the admission of pressure from a steady supply; forward and reverse ports 83 and 84 respectively for the connection of forward and reverse pressure pipe lines, suitable end ports for valve actuating pressures and exhaust ports 83$^a$ and 84$^a$ respectively. The valve in said cylinder is of the floating type and is adapted to be shifted back and forth to open one pressure line and close the other. Said main valve is actuated in one direction by the movement of the plunger piston upon nearing the uppermost end of its upward stroke there being provided for this purpose an automatic trip valve at 85 actuated by a cam lever 86 said cam lever being designed to be actuated by a roller 87 secured to the stem of the plunger. The main valve is caused to be operated in the opposite direction by a floating piston 88 in the cushion cylinder of the table rotating mechanism said piston acting on a valve 89 in advance of the floating piston.

In Fig. 12 the several cylinders referred to in the detailed description of the machine are indicated as having connected thereto pipes for supplying and exhausting pressure. As suggested by the legend Fig. 12, the solid lines indicate constant pressure pipes, the dash and dot lines indicate valve actuating lines and the double lines and block lines indicate cylinder operating lines. The constant pressure air is connected at three different points namely the supply, the pressing pressure, which in practice is from 20 to 35 pounds, operating pressure of 25 pounds, and blow pressure of 5 pounds. The pressing pressure is connected to the pressing cylinder operating valve and the trip valve 91 for the operator. The operating pressure is connected to the main valve, reverse valves 89 and 94 and regulator by-pass or cushion valve at 92. The blowing pressure pipe is connected to the blow head.

From the starting position (which is with the plunger out of the mold to be freshly charged) the piston in the pressing cylinder is at its topmost position and the main or operating valve in position to admit pressure to the block line the exhaust being in the double line. With the main valve in this position the mold lock cylinder is down gripping the blow mold, the blow mold cylinder is down with the blow head on the blow mold, the mold locking cylinder is forward clamping the outer ends of the ring carriers, the piston of lift cylinder is up with the blank or parison mold in position supported by the pawl, the mold closing cylinder is forward with its mold closed, the mold opening cylinder is in the opposite direction with the blow mold open, the slide operating cylinders are both forward with the slide in at the mold closing position and out on the opposite side of the machine. The piston of the lock cylinder is in the upward position locking the table and the rotating pin piston is in the lowered position, the arms carrying the rotating pin is in its retracted position and has tripped the reverse valve at 94, the air of which has shifted the pressing cylinder operating valve into a position to admit air to the lower side of that piston and hold the plunger out of the mold. The reverse valve 76$^a$ at 94 is substantially like that shown in detail at 89. Each of the valves 76$^a$ after operation by the adjacent piston is restored to projecting position by fluid pressure entering the outer end of its chamber. In starting the machine the trip valve 91 is pressed to shift the main valve in the opposite direction and thereby cause the air in the double line pipe to become the pressure and the block line the exhaust. The reversal of main valve 81 admits pressure to the lower end of the rotating pin cylinder, as well as in rear of the rotating cylinder and in the upper end of the table lock cylinder. The shifting of the main valve in this manner unlocks the table and moves it forward 45 degrees, the table being cushioned by the cushion cylinder 78 regulated by the valve 78$^a$ in the by-pass 92. At the end of the stroke the piston in the cushion cylinder engages the reverse valve 89 and again reverses the main valve 81 causing the lock cylinder to lock the table, the release of the pin of the table rotating arm and the retrograde movement of the table rotating piston, the travel of which latter is regulated by a plunger spring actuated valve at 93 having an adjustable screw 93$^a$ for limiting its movement.

The piston in 76 on its return stroke actuates a piston valve 76$^a$ and liberates pressure to the right hand side of valve 95 moving same to admit pressure to the lower end of pressing plunger cylinder causing it to travel upward. Roller 87 on the stem of the pressing piston then actuates valve in 85 to admit pressure to left hand end port of the main valve 81. In coming down roller 87 actuates lever 86 but at the time there is no pressure in the line because the piston in 76 is forward and valve in exhaust position. Thus the valve 76ᵃ at the right hand end of cylinder 76 serves two purposes, to wit; first to reverse the valve on 49 and admit pressure to close the valve 85 and second to actuate main valve 81 when the roller 87 acts on pressure lever 86 on the up stroke. There is, therefore, no pressure in 85 when roller 87 comes down against lever 86.

96 is a shut off cock for the purpose of cutting off air to valve on 49 in order to stop the operation of the pressing cylinder when it is desired to move the table by hand or when it is desired to rotate the table with the table rotating means without actuating the pressing plunger but in this event the pressure for actuating the left hand end of the main valve 81 is obtained by opening the valve at 91.

When the piston in the table rotating cylinder 76 engages the reverse valve 94 it reverses the pressing cylinder operating valve 95 causing the plunger to rise and also permitting the admission of pressure into the automatic trip valve 85 which is engaged by the roller on the piston arm when near the top of its stroke pressing the lever down, opening the valve and causing the air to flow against the opposite end of the main valve 81 thereby causing automatically the repetition of the operation described.

101 designates a cylinder having an anchoring piston rod stem 102 so that the truck and its machine may be moved back and forth with reference to a furnace. Pressure for performing this operation can be taken from the main source and controlled by an independent hand operated valve to admit pressure to one side or the other of the piston according to the movement to be effected.

The forms of the parts can be varied without departing from the gist of the invention as claimed.

What I claim is:

1. In a machine for pressing and blowing glass vessels, the combination of a plurality of neck ring molds each composed of horizontally closable sections, a plurality of co-operating body molds each composed of independently horizontally closable sections, a plurality of vertically movable parison molds each adapted to cooperate with a neck ring mold to form a parison, a horizontally slidable carrier for each of said parison molds, a body mold bottom also mounted on each of said carriers and means for automatically shifting said carrier to place one of the parison molds into position for projection into cooperating relation with the sections of one of the neck ring molds and a body mold bottom into cooperating relation with the sections of the body mold of another neck ring mold.

2. In a machine for pressing and blowing glass vessels, the combination of a neck ring mold composed of sections, means for opening and closing them, a body mold to co-operate with the neck ring mold, said body mold composed of sections, means for opening and closing them independently of the neck ring, a bottom for the closed body sections, a parison mold, a carrier for both the bottom and parison mold and means for shifting the bottom into position to form the bottom of said mold and means to shift the parison into cooperating relation with the neck ring mold to form the parison.

3. In a machine for pressing and blowing glass vessels, the combination of a neck ring mold composed of sections, means for opening and closing them, a body mold to co-operate with the neck ring mold, said body mold composed of sections, means for opening and closing them independently of the neck ring mold, a bottom for the closed body sections, a parison mold, a carrier for both the bottom and parison mold, means for shifting the bottom into position to form the bottom of said body mold and means to shift the parison into cooperating relation with the neck ring mold to form the parison, a plunger to form the parison, means for releasing the parison mold from the parison, means for shifting the neck ring with the parison, and means for closing the body mold around the parison.

4. In a machine of the kind described, the combination of a plurality of pairs of neck ring sections adapted to be opened and closed, a plurality of pairs of body mold sections also adapted to be opened and closed but independently of the neck mold sections, a removable bottom for the blow mold, a parison mold and a plunger to form the parison therein, a blow head, a carrier for both the parison and the blow mold bottom, and means for automatically shifting said carrier to place the parison and blow mold bottom alternately in line axially with a given pair of the mold sections.

5. In a machine of the kind described, the combination of a plurality of pairs of neck ring sections adapted to be opened and closed, a plurality of pairs of body mold sections also adapted to be opened and closed but independently of the neck mold sections, a removable bottom for the blow mold, a parison mold and a plunger to form the parison therein, a blow head, a carrier for both the parison and the blow mold bottom, said parison being vertically movable in the carrier, and means for automatically shifting said carrier to place the parison and blow mold bottom alternately in line axially with a given pair of the mold sections.

6. In a machine for pressing and blowing glass vessels, the combination of a plurality of neck ring molds each composed of horizontally closable sections, a plurality of cooperating body molds each composed of horizontally closable sections, a plurality of vertically movable parison molds each adapted to cooperate with a neck ring mold to form a parison, a horizontally slidable carrier for each of said parison molds, a body mold bottom fixedly mounted on each of said carriers and means for automatically shifting said carrier to place one of the parison molds into position for projection into cooperating relation with one of the neck ring molds and a body mold bottom into cooperating relation with the sections of the body mold of another neck ring mold.

EDWARD MILLER.